May 24, 1955  P. A. ENGSTROM  2,708,824
WATER COOLED EXHAUST ELBOW
Filed Nov. 9, 1950
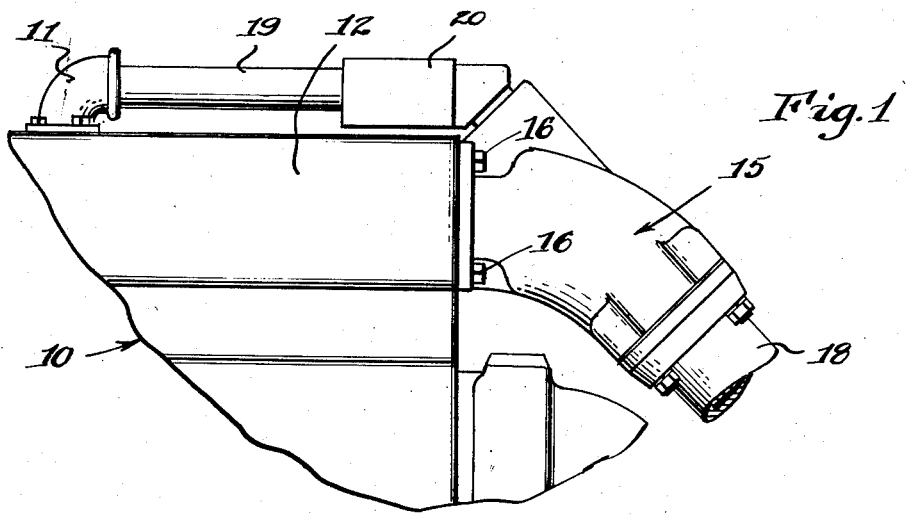
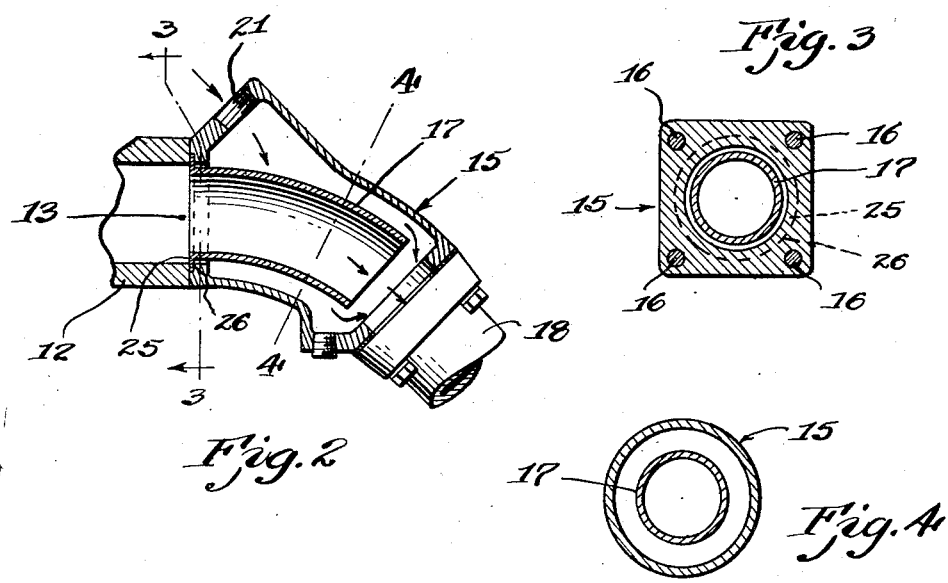
INVENTOR.
Paul A. Engstrom
BY
Hauke + Hardesty
Attorneys.

United States Patent Office 2,708,824
Patented May 24, 1955

2,708,824

WATER COOLED EXHAUST ELBOW

Paul A. Engstrom, Detroit, Mich., assignor to Gray Marine Motor Company, Detroit, Mich., a corporation of Michigan Application November 9, 1950, Serial No. 194,890

6 Claims. (Cl. 60—30)

My invention relates to marine engines and more particularly to a water-cooled exhaust elbow for such engine.

As every boat builder or owner knows, the problem of introducing overflow water into the exhaust pipe is an old one. It is one problem that is often neglected, and a careless or unproven installation may often result, and does in many cases result in sticking valves, sludge formation and other serious troubles.

It is the object of my present invention to construct an adapter, commonly referred to as an exhaust elbow for obtaining efficient and reliable marine engine operation, by providing a water-cooled exhaust elbow embodying a copper tube supported at one end and cooled throughout its length by the engine's overflow water which is introduced into the elbow at a point where it cannot get sucked back into the valves, thereby eliminating all chances of having serious operating difficulties.

For a more detailed understanding of my invention, reference may be had to the accompanying invention wherein like characters refer to like parts throughout the several views, and in which Fig. 1 is a fragmentary side elevational view of an engine showing my novel water-cooled exhaust elbow assembled therewith.

Fig. 2 is a longitudinal sectional view of the exhaust elbow showing same attached to the outlet end of an engine exhaust manifold.

Fig. 3 is a transverse sectional view thereof taken substantially on the line 3—3 of Fig. 2, and Fig. 4 is another detail transverse sectional view taken on the line 4—4 of Fig. 2.

In a marine engine 10 of the type most generally used, the cooling water for said engine is pumped into the engine cooling jacket, is circulated through the block and cylinder head and thence to an outlet 11 where same is conducted to be dumped overboard or as in this case is used to cool the exhaust pipe.

The engine exhaust manifold 12 is customarily water cooled also, but these conventional engine and manifold constructions are not shown here in detail since such constructions do not form a part of my present invention. An exhaust elbow 15, preferably constructed of cast iron, is secured by bolts 16 or other convenient securing means to the outlet end 13 of the engine exhaust manifold. The scorching exhaust gases from the engine are discharged into the exhaust manifold and thence into a downturned elbow like tube 17 of copper or other suitable metal having good heat conducting characteristics and thence into the exhaust tail pipe 18 leading preferably to a point below the water level outside the boat.

The overflow water from the engine is preferably taken out through outlet 11 in the top of the cylinder head, is carried by pipe or conduit 19, to coupling 20 and thence to the inlet 21 in the exhaust elbow 15. This overflow water is dumped on the hot exhaust tube 17 and much of the water or most all of it is turned to steam, the water and steam mingling with the exhaust gas as it emerges from the end of this tube 17 and led to the exhaust tail pipe 18.

This tube 17 is subjected to the cooling influence of the overflow water throughout its entire length and because the outlet of the tube 17 is below the outlet 13 of the manifold, there is no tendency for the steam to be sucked back into the manifold or backed into the valves.

It will be noted that the copper tube 17 is separate from the main elbow casting and both parts of the assembly are secured to the exhaust manifold. The tube 17 is provided with a flange 25, which seats into a pocket or recess 26 in the end of the elbow 15 and is thus positively located substantially concentrically within the elbow 15. The tube is thus supported at one end and is permitted to freely expand or contract relative to the elbow casting.

While I have illustrated but one form of my invention, it will be apparent to those skilled in the art to which my invention pertains that various changes and modifications may be made herein without departing from the spirit of my invention or from the scope of the appended claims.

I claim:

1. A water-cooled exhaust elbow for a marine engine having an exhaust manifold provided with an outlet, and comprising a separable assembly consisting of a tube secured at one end only to the outlet end of said engine exhaust manifold and a jacket elbow structure around said tube and having a water inlet and an outlet to which an exhaust outlet pipe is attached.

2. A water-cooled exhaust elbow for a marine engine having an exhaust manifold provided with an outlet, and comprising a separable assembly consisting of a tube secured at one end only to the outlet end of said engine exhaust manifold and a jacket elbow structure around said tube and having a water inlet and an outlet to which an exhaust outlet pipe is attached, said tube terminating immediately adjacent to the outlet of said elbow structure.

3. A water-cooled exhaust elbow for a marine engine having an exhaust manifold provided with an outlet, and comprising a separable assembly consisting of a tube secured at one end only to the outlet end of said engine exhaust manifold and a jacket elbow structure around said tube and having a water inlet and an outlet to which an exhaust outlet pipe is attached, said tube terminating immediately adjacent to the outlet of said elbow structure, said water inlet disposed above the tube adjacent to its juncture with said exhaust manifold and discharging the water directly onto the exterior surface of said tube.

4. A water-cooled exhaust elbow for a marine engine having an exhaust manifold provided with an outlet, and comprising a separable assembly consisting of a tube secured at one end only to the outlet end of said engine exhaust manifold and a jacket elbow structure around said tube and having a water inlet and an outlet to which an exhaust outlet pipe is attached, said tube terminating immediately adjacent to the outlet of said elbow structure, said water inlet disposed above the tube adjacent to its juncture with said exhaust manifold and discharging the water directly onto the exterior surface of said tube, both said tube and elbow structure curved downwardly and said tube disposed substantially concentrically within the elbow structure, the outlet of said tube disposed at a point below the level of the exhaust manifold outlet.

5. A water-cooled exhaust elbow for a marine engine having an exhaust manifold provided with an outlet, and comprising a separable assembly consisting of a tube secured at one end only to the outlet end of said engine exhaust manifold and a jacket elbow structure secured to the end face of the exhaust manifold and disposed around said tube and having a water inlet and an outlet to which an exhaust outlet pipe is attached, said tube terminating immediately adjacent to the outlet of said elbow structure, said water inlet disposed above the tube adjacent to its juncture with said exhaust manifold and discharging the water directly onto the exterior surface of said tube, both said tube and elbow structure curved downwardly and said tube disposed substantially concentrically within the elbow structure, the outlet of said tube disposed at a point below the level of the exhaust manifold outlet, said tube having a flange at its inlet end adapted to be seated against the end face of the exhaust manifold and clamped thereto by said elbow structure.

6. A water-cooled elbow for a marine engine having an exhaust manifold provided with an outlet, and comprising a separable assembly consisting of a tube secured at one end only to the outlet end of said engine exhaust manifold and a jacket elbow structure secured to the end face of the exhaust manifold and disposed around said tube and having a water inlet and an outlet to which an exhaust outlet pipe is attached, said tube terminating immediately adjacent to the outlet of said elbow structure, said water inlet disposed above the tube adjacent to its juncture with said exhaust manifold and discharging the water directly into the exterior surface of said tube, both said tube and elbow structure curved downwardly and said tube disposed substantially concentrically within the elbow structure, the outlet of said tube disposed at a point below the level of the exhaust manifold outlet, said tube having a flange at its inlet end adapted to be seated against the end face of the exhaust manifold and clamped thereto by said elbow structure, said elbow structure having a recessed end face receiving said tube flange and serving to locate said tube relative to the elbow structure.

References Cited in the file of this patent

UNITED STATES PATENTS

| | | |
|---|---|---|
| 419,126 | Jones | Jan. 7, 1890 |
| 793,885 | Low et al. | July 4, 1905 |
| 799,013 | Moffitt | Sept. 5, 1905 |
| 900,576 | Nelson et al. | Oct. 6, 1908 |
| 2,198,229 | Price | Apr. 23, 1940 |
| 2,204,294 | Blanchard | June 11, 1940 |
| 2,304,609 | Stokes | Dec. 8, 1942 |
| 2,312,399 | Franz | Mar. 2, 1943 |

FOREIGN PATENTS

| | | |
|---|---|---|
| 395,880 | France | Jan. 9, 1909 |
| 30,742 | Norway | May 18, 1920 |